(12) United States Patent
Chen

(10) Patent No.: US 10,402,513 B2
(45) Date of Patent: Sep. 3, 2019

(54) CALCULUS TARGETING METHOD AND SYSTEM

(71) Applicant: LITE-MED INC., Taipei (TW)

(72) Inventor: Yi-Hsin Chen, Taipei (TW)

(73) Assignee: Lite-Med Inc., Taipei (TW)

( * ) Notice: Subject to any disclaimer, the term of this patent is extended or adjusted under 35 U.S.C. 154(b) by 182 days.

(21) Appl. No.: 15/475,795

(22) Filed: Mar. 31, 2017

(65) Prior Publication Data
US 2018/0285489 A1   Oct. 4, 2018

(51) Int. Cl.
*G06F 17/50*   (2006.01)

(52) U.S. Cl.
CPC ...... *G06F 17/5009* (2013.01); *G06F 2217/16* (2013.01)

(58) Field of Classification Search
USPC .................................................. 703/2, 5, 6
See application file for complete search history.

(56) References Cited

U.S. PATENT DOCUMENTS

| | | | | |
|---|---|---|---|---|
| 5,065,741 A * | 11/1991 | Uchiyama | ......... | A61B 17/2255 600/439 |
| 5,287,856 A * | 2/1994 | Treiber | ............. | A61B 17/2256 600/439 |
| 5,515,478 A * | 5/1996 | Wang | ..................... | A61B 34/70 600/587 |
| 5,524,180 A * | 6/1996 | Wang | ................. | B60R 21/0132 600/117 |
| 5,657,429 A * | 8/1997 | Wang | ..................... | A61B 34/70 600/118 |
| 5,754,741 A * | 5/1998 | Wang | ..................... | A61B 34/70 600/417 |
| 6,804,581 B2 * | 10/2004 | Wang | ..................... | A61B 34/70 600/101 |
| 2013/0211294 A1 * | 8/2013 | Bohris | ................ | A61H 23/008 601/4 |

\* cited by examiner

*Primary Examiner* — Thai Q Phan
(74) *Attorney, Agent, or Firm* — Rosenberg, Klein & Lee

(57) ABSTRACT

A calculus targeting system for performing a calculus targeting method includes a processor, a storage unit, a calculus coordinate acquisition module, a model establishing module, a prediction module, a firing determination module, and a shock wave module, all the latter six of which are connected to the processor. The calculus targeting method can be programmed as a computer program product and essentially includes a sampling step for acquiring different sets of calculus coordinates in a sampled respiration cycle, a model establishing step for establishing a prediction model, and a firing determination step for determining according to the prediction model whether to fire or not.

10 Claims, 8 Drawing Sheets

CALCULUS TARGETING METHOD AND SYSTEM

BACKGROUND OF THE INVENTION

1. Technical Field

The present invention relates to a targeting method and system. More particularly, the invention relates to a method and system for targeting a calculus.

2. Description of Related Art

Extracorporeal shock wave lithotripsy (ESWL) has wide application in the medical field, such as in the treatment of kidney stones, ureteral stones, bladder stones, and other calculi. ESWL works on shock waves, which propagate through such media as water and human tissues and are focused on a calculus, either through lenses or by the self-focusing function of the shock wave source, in order to break the calculus with the high pressure generated by the shock waves.

As the location of a calculus may be shifted away from the shock wave focused area due to the patient's respiration, it is likely that the shock waves are not focused precisely on the calculus. Should this happen, the calculus breaking effect will be compromised, if not lost. Also, the shock waves may damage tissues beside the calculus, causing unwanted side effects and sequelae.

In light of the above, the inventor of the present invention proposed a "Calculus Targeting and Locking System" as disclosed in Published Taiwan Invention Patent Application No. 201544076. The system entails calculating the shifting amount and direction of calculus coordinates between images in relation to the center of the target area, in order to track the calculus and thereby increase the precision of ESWL. In addition, Taiwan Invention Patent No. 1279221, entitled "Extracorporeal Lithotripter and Calculus Tracking and Locating System Thereof", discloses determining the location of a shifted calculus by adding an image motion vector to a previously determined calculus location. These prediction methods are nevertheless conducive to a lack of firing precision because of errors generated by delays in image transmission or calculation.

Moreover, U.S. Pat. No. 5,065,741 A, entitled "Extracorporeal Ultrasonic Lithotripter with a Variable Focus", discloses that a calculus tends to be displaced in a cyclic manner attributable to respiration, and that therefore the possible location of a calculus can be determined by observing the calculus with an ultrasonic apparatus for a predetermined amount of time in order to decide when to fire shock waves. During a shock wave treatment, however, the displacement of a calculus may vary from one respiration cycle to another, depending on the patient's breathing condition. This makes it difficult to provide an accurate prediction of the location of the calculus.

BRIEF SUMMARY OF THE INVENTION

To improve the precision of extracorporeal shock wave lithotripsy, the inventor of the present invention provides a calculus targeting method that includes a sampling step, a model establishing step, a prediction step, and a firing determination step. In the sampling step, a calculus coordinate acquisition module acquires a set of calculus coordinates of a calculus at each of a plurality of different time points in at least one sampled respiration cycle. In the model establishing step, a model establishing module establishes a time and location correlation table of a fixed sampling interval according to the calculus coordinates acquired and then establishes a prediction model based on the time and location correlation table. The prediction model includes a motion function and a direction and time correlation table. The motion function is formed by substituting data in the time and location correlation table into a predetermined original equation. The direction and time correlation table, on the other hand, includes data derived from the time and location correlation table, wherein the derived data include equally spaced coordinate components corresponding to a time axis. In the prediction step, the calculus coordinate acquisition module obtains a displacement direction by analyzing a plurality of sets of the calculus coordinates acquired and acquires the current calculus coordinates of the calculus, in order for a first prediction module to derive a first set of predicted calculus coordinates from the current calculus coordinates and the motion function, and for a second prediction module to obtain a second set of predicted calculus coordinates by looking up the direction and time correlation table, which has a predetermined time interval, according to the displacement direction and the current calculus coordinates. The first set of predicted calculus coordinates correspond to a weight, and the second set of predicted calculus coordinates correspond to a weight different from the weight of the first set of predicted calculus coordinates. The weights can be adjusted by a weight adjustment module according to whether or not the first set of predicted calculus coordinates and the second set of predicted calculus coordinates are accurate. In the firing determination step, a firing determination module determines it is time to drive a shock wave module to generate a shock wave toward a predetermined target area when the first or second set of predicted calculus coordinates, whichever have the greater weight, are within the target area.

Preferably, the calculus coordinate acquisition module acquires calculus images of the calculus through an image taking module and derives the calculus coordinates from the characteristics of the calculus images.

Preferably, a plurality of respiration cycles are sampled, and coordinate components corresponding to identical or adjacent time points in the sampled respiration cycles are rendered into a single coordinate component by a statistical method.

Preferably, the original equation is a simple harmonic motion function or a linear function.

Preferably, the original equation is a simple harmonic motion function expressed by:

$$f(x) = (h-l)\left[0.5\sin\left(\frac{2\pi x}{t} - 0.5\pi\right) + 0.5\right] + l,$$

$$x = \begin{cases} x, & x < t \\ x \bmod t, & x \geq t \end{cases},$$

where h is the greatest value of a coordinate component of a set of calculus coordinates acquired from a sampled respiration cycle, l is the smallest value of the coordinate component of the set of calculus coordinates acquired from the sampled respiration cycle, t is the duration of the sampled respiration cycle, and x is a specific time point.

Preferably, the original equation is a linear function expressed by:

$$f(x) = \frac{2x(h-l)}{t} + l,$$

$$x = \begin{cases} x, & \leq 0.5 \\ t-x, & 0.5t < x < t, \\ x \bmod t, & x \geq t \end{cases}$$

where h is the greatest value of a coordinate component of a set of calculus coordinates acquired from a sampled respiration cycle, l is the smallest value of the coordinate component of the set of calculus coordinates acquired from the sampled respiration cycle, t is the duration of the sampled respiration cycle, and x is a specific time point.

Preferably, the calculus targeting method further includes a verification step, a prompting step, an error analysis step, and an error correction step. In the verification step, a verification module compares the first or second set of predicted calculus coordinates with the calculus coordinates updated after firing and determines whether or not the difference between the first or second set of predicted calculus coordinates and the calculus coordinates updated after firing is greater than a predetermined threshold value. If yes, one or a combination of the prompting step, the error analysis step, and the error correction step are performed. The prompting step generates a prompt signal. The error analysis step analyzes the cause of the error of the first or second set of predicted calculus coordinates. The error correction step corrects the prediction model with a correction module to increase accuracy of the predicted calculus coordinates.

Preferably, the error analysis step includes a height comparison sub-step and a limit comparison sub-step. The height comparison sub-step compares the vertical height of the first or second set of predicted calculus coordinates with the vertical height of the calculus coordinates updated after firing to generate a vertical height difference. If the vertical height difference is greater than a height difference threshold value, execution of the calculus targeting method is terminated.

Preferably, the error analysis step includes a limit comparison sub-step. The limit comparison sub-step determines whether or not each coordinate component of the calculus coordinates updated after firing is between the corresponding greatest value and the corresponding smallest value in the time and location correlation table and/or the direction and time correlation table. If a coordinate component of the calculus coordinates updated after firing is not between the corresponding greatest value and the corresponding smallest value in the time and location correlation table and/or the direction and time correlation table, the corresponding greatest value and the corresponding smallest value are adjusted according to the calculus coordinates updated after firing.

The present invention may alternatively be a calculus targeting method that includes a sampling step, a model establishing step, a prediction step, and a firing determination step as described below. In the sampling step, a calculus coordinate acquisition module acquires a set of calculus coordinates of a calculus at each of a plurality of different time points in at least one sampled respiration cycle. In the model establishing step, a model establishing module establishes a time and location correlation table of a fixed sampling interval according to the calculus coordinates acquired and then establishes a prediction model based on the time and location correlation table. The prediction model includes a motion function formed by substituting data in the time and location correlation table into a predetermined original equation. In the prediction step, the calculus coordinate acquisition module acquires the current calculus coordinates of the calculus, in order for a first prediction module to derive a first set of predicted calculus coordinates from the current calculus coordinates and the motion function. In the firing determination step, a firing determination module determines it is time to drive a shock wave module to generate a shock wave toward a predetermined target area when the first set of predicted calculus coordinates are within the target area.

Each of the foregoing calculus targeting methods described above can be implemented as a program and stored in a computer program product. Once the program is loaded into a computer and executed, the corresponding calculus targeting method is carried out.

The present invention may alternatively be a calculus targeting system for targeting a calculus of a subject under examination, wherein the calculus targeting system includes a processor, a storage unit, a calculus coordinate acquisition module, a model establishing module, a prediction module, a weight adjustment module, and a firing determination module. The storage unit is connected to the processor and is configured to store a predetermined motion function. The calculus coordinate acquisition module is connected to the processor and is configured to acquire a set of calculus coordinates of the calculus at each of a plurality of different time points in a sampled respiration cycle. The model establishing module is connected to the processor and is configured to establish a time and location correlation table according to the calculus coordinates acquired and establish a prediction model based on the time and location correlation table. The prediction model includes the motion function and a direction and time correlation table. The motion function is formed by substituting data in the time and location correlation table into a predetermined original equation. The direction and time correlation table includes data that are derived from the time and location correlation table, wherein the derived data include equally spaced coordinate components corresponding to a time axis. The prediction module is connected to the processor and includes a preparation module, a first prediction module, and a second prediction module. The preparation module is configured to obtain a displacement direction by analyzing the calculus coordinates acquired, through the calculus coordinate acquisition module, and to acquire the current calculus coordinates of the calculus, also through the calculus coordinate acquisition module. The first prediction module is configured to derive a first set of predicted calculus coordinates from the current calculus coordinates and the motion function. The second prediction module is configured to obtain a second set of predicted calculus coordinates by looking up the direction and time correlation table, which has a predetermined time interval, according to the displacement direction and the current calculus coordinates. The first set of predicted calculus coordinates correspond to a weight, and the second set of predicted calculus coordinates correspond to a weight different from the weight of the first set of predicted calculus coordinates. The weight adjustment module is connected to the processor and is configured to adjust the weights according to whether or not the first set of predicted calculus coordinates and the second set of predicted calculus coordinates are accurate. The firing determination module is connected to the processor so that, when the first or second set of predicted calculus coordinates, whichever have the greater weight, are within a predetermined target area, the firing determination module determines it is time to drive a shock wave module to generate a shock wave toward the target area.

The technical features described above can produce the following effects:

1. The calculus targeting process takes into account an individual patient's respiration regularity (or irregularity) so that a practical prediction model can be established. Also, the undesirable effects of delays in image transmission or calculation are minimized to add to the accuracy of prediction.

2. The motion function can provide relatively accurate predicted calculus coordinates when the patient breathes stably, and the direction and time correlation table, when the patient breathes in an instable manner that renders the rationalized motion function inapplicable. In other words, the direction and time correlation table helps correct the prediction when the patient's respiration becomes instable.

3. The prediction model can work with the motion function alone, without having to rely on both the motion function and the direction and time correlation table when determining the predicted calculus coordinates.

4. If the verification result indicates that the prediction model is abnormal, the system can provide a real-time feedback or even allow the prediction model to be corrected immediately so as to increase the safety of use of the system.

DETAILED DESCRIPTION OF THE INVENTION

The present invention incorporates the aforementioned technical features into a calculus targeting method and system, whose major effects are detailed below with reference to some illustrative embodiments.

The calculus targeting system according to an embodiment of the present invention is used in conjunction with a computer system in order to perform a calculus targeting method. The calculus targeting method can be implemented as a program and stored in a computer program product or a computer-readable recording medium. Once the program is loaded into and executed by a computer, the calculus targeting method is carried out.

Figure 1:
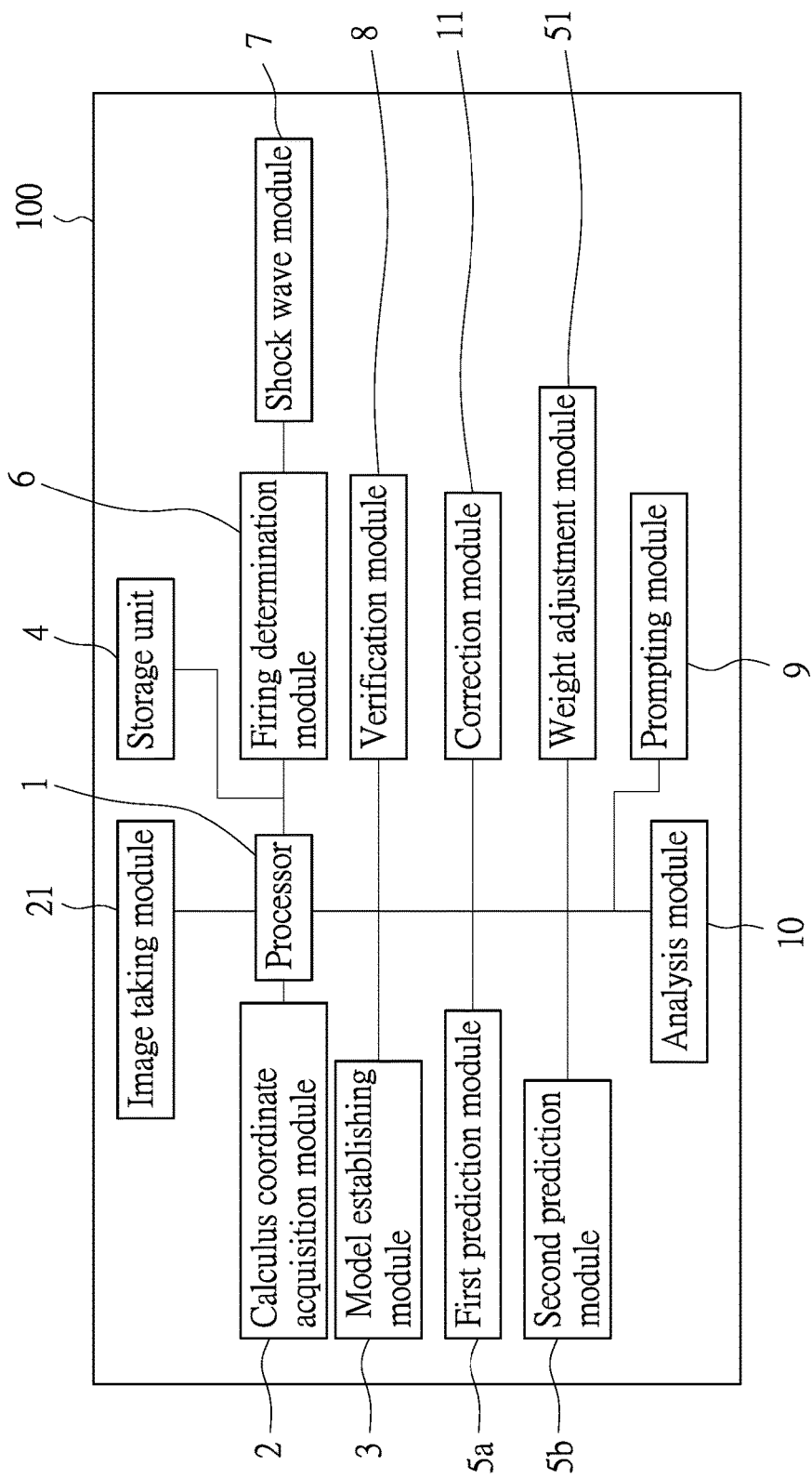
FIG. 1 schematically shows the system structure of an embodiment of the present invention.
Figure 2:
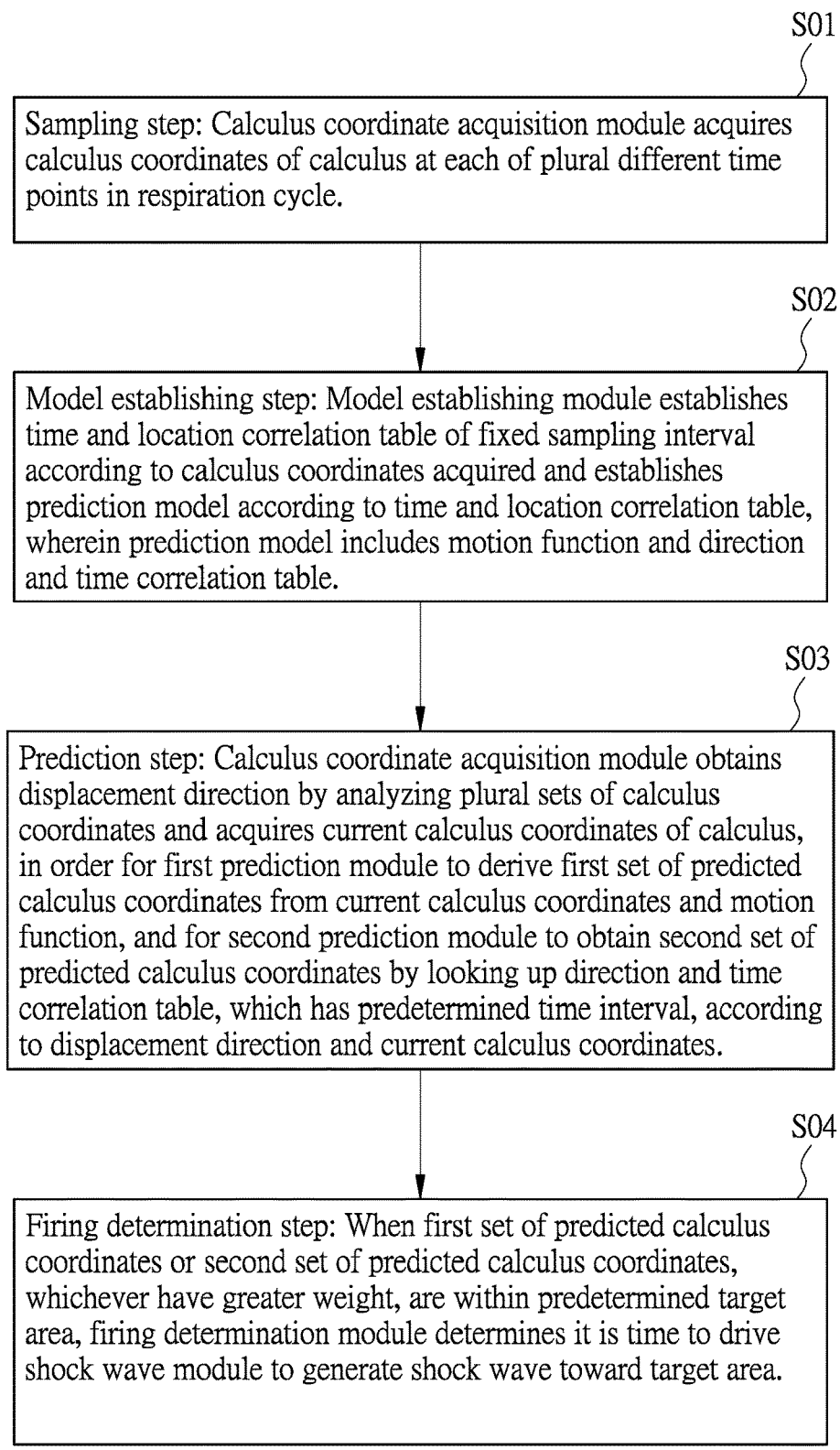
FIG. 2 is a flowchart showing the essential steps of an embodiment of the present invention.

Referring to FIG. 1 and FIG. 2, the calculus targeting system 100 essentially includes a processor 1, a calculus coordinate acquisition module 2, a model establishing module 3, a storage unit 4, a first prediction module 5a, a second prediction module 5b, a firing determination module 6, and a shock wave module 7, all the latter seven of which are connected to the processor 1. The calculus coordinate acquisition module 2 is configured to acquire the coordinates (hereinafter referred to as the calculus coordinates) of a calculus. The model establishing module 3 is configured to establish a prediction model. The firing determination module 6 is configured to determine whether or not shock waves should be fired, and if yes, the firing determination module 6 drives the shock wave module 7 to generate a shock wave toward a target area. The calculus targeting system 100 is thus configured to perform a sampling step S01, a model establishing step S02, a prediction step S03, and a firing determination step S04 of the calculus targeting method, as described in more detail below.

Figure 3A:
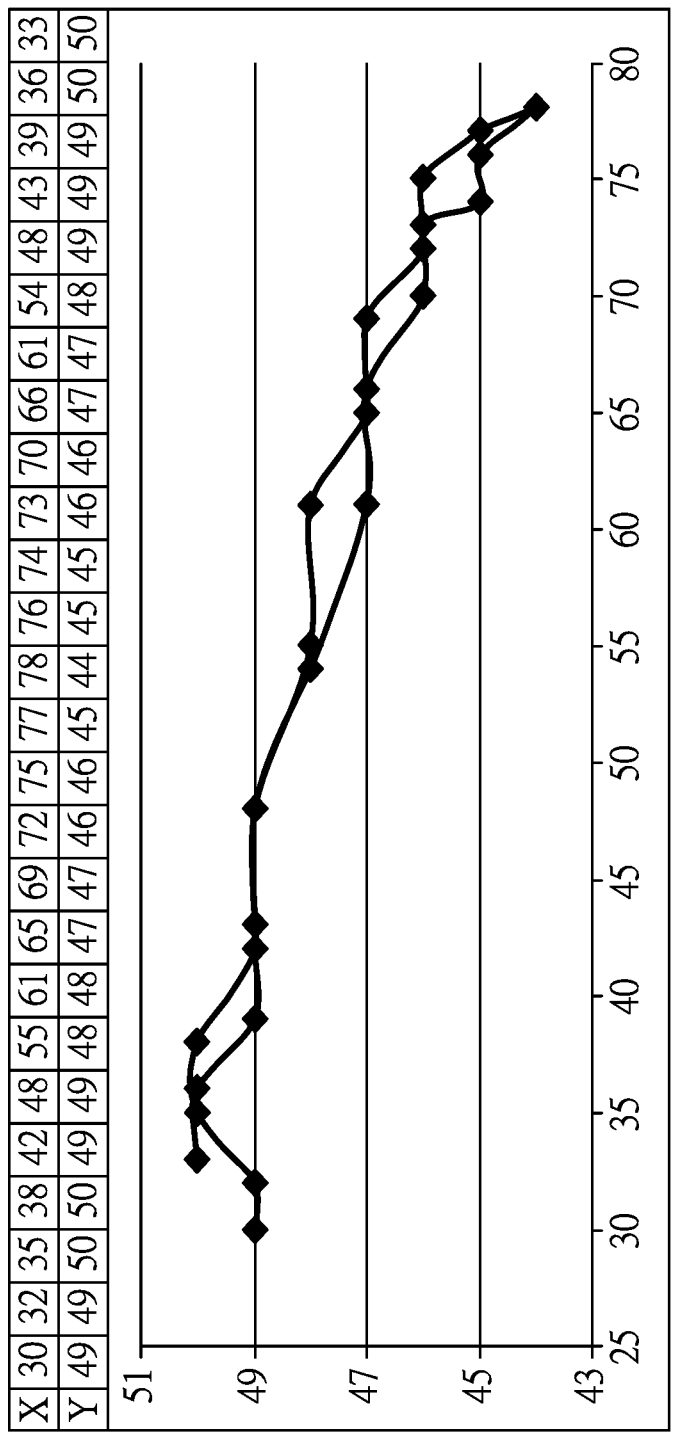
FIG. 3A is a coordinate graph corresponding to a first respiration cycle sampled according to the embodiment of FIG. 2.
Figure 3B:
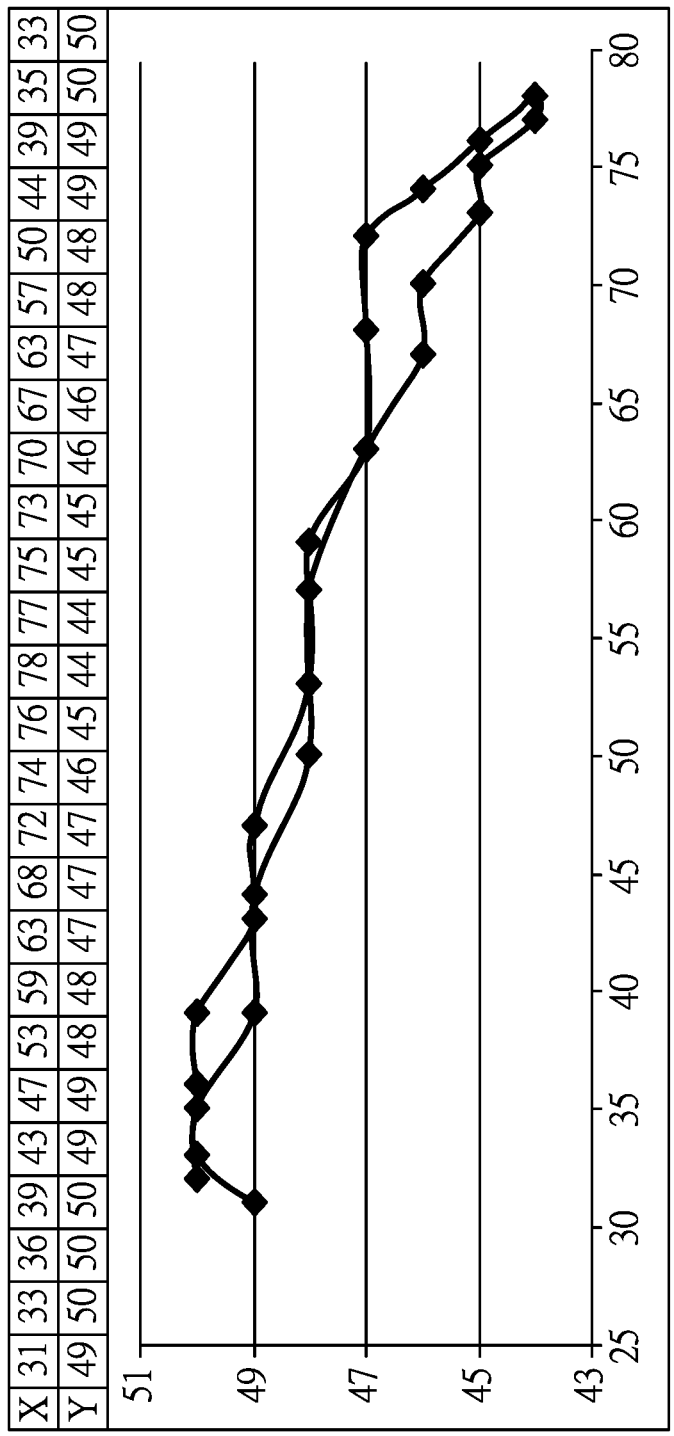
FIG. 3B is a coordinate graph corresponding to a second respiration cycle sampled according to the embodiment of FIG. 2.

In the sampling step S01, the calculus coordinate acquisition module 2 acquires a set of calculus coordinates of the calculus at each of a plurality of different time points in at least one sampled respiration cycle. More specifically, the calculus coordinate acquisition module 2 takes images (hereinafter referred to as calculus images) of the calculus through an image taking module 21 and derives the calculus coordinates from the characteristics of the calculus images. For example and without limitation, the brightness values of a calculus image are analyzed by an image analysis and processing technique to find the brightest point in the calculus image as the characteristic of the calculus image, and the coordinates of the brightest point are taken as the calculus coordinates. It is worth mentioning that the brightest point may alternatively be a user-defined relatively bright point in the calculus image. In this embodiment, the sampling step S01 is conducted over a plurality of (e.g., more than three) respiration cycles, at a sampling interval of 100 milliseconds, and the relatively instable cycle or cycles (e.g., the first sampled respiration cycle or those with a relatively large difference between coordinates) are excluded. FIG. 3A and FIG. 3B, for example, show the results obtained respectively from a first sampled respiration cycle and a second sampled respiration cycle. It should be pointed out that the sampling step S01 is not limited to sampling; a calculus can be shattered by a basic targeting process while sampling takes place, with corrections, if needed, made after sampling is completed. For more details on basic targeting, please refer to the targeting methods disclosed in, for instance, Published Taiwan Invention Patent Application No. 201544076, entitled "Calculus Targeting and Locking System", and Taiwan Invention Patent No. 1279221, entitled "Extracorporeal Lithotripter and Calculus Tracking and Locating System Thereof".

Figure 4:
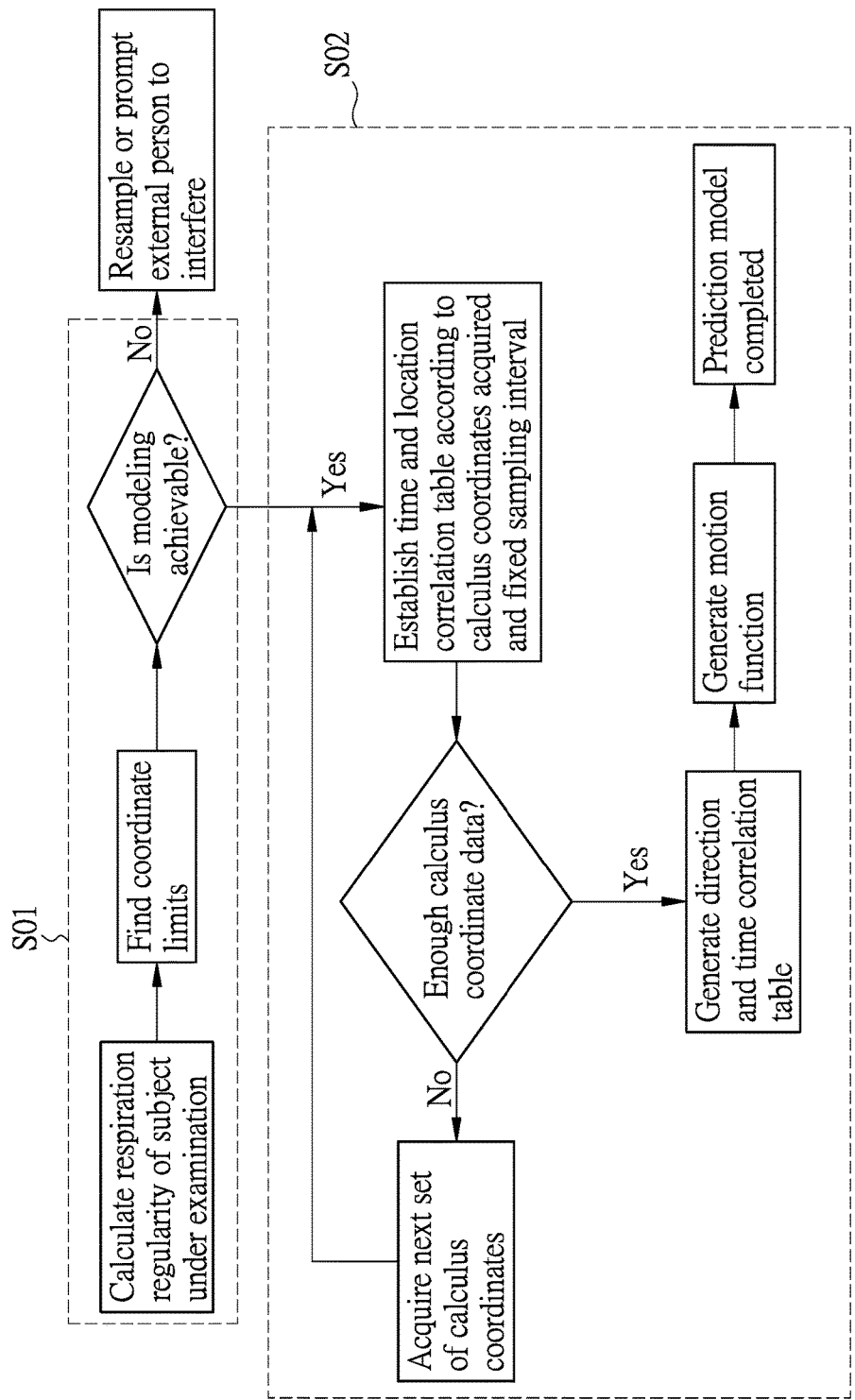
FIG. 4 is a detailed flowchart of the sampling step and the model establishing step of the embodiment of FIG. 2.

Referring to FIG. 4, the sampling step S01 also includes determining whether modeling can be achieved, the criterion being whether the regularity (or irregularity) of the sampled respiration cycles is within a predetermined range of tolerance. If the regularity (or irregularity) of the sampled respiration cycles is not within the predetermined range of tolerance, resampling is required. If a certain amount of time (e.g., 10 minutes) has passed without modeling determined as achievable, basic targeting will be performed. If the regularity (or irregularity) of the sampled respiration cycles is within the predetermined range of tolerance, a time and location correlation table will be established in the model establishing step S02 that follows. In the model establishing step S02, the model establishing module 3 establishes a time and location correlation table of a fixed sampling interval according to the calculus coordinates acquired and establishes a prediction model according to the time and location correlation table, wherein the prediction model includes a motion function and a direction and time correlation table. More specifically, the time and location correlation table can be based on the time axis and include only the X-axis coordinates (or X-axis coordinate components), and coordinate components corresponding to identical or adjacent time points in the sampled respiration cycles are rendered into a single coordinate component by a statistical method (e.g., the arithmetic average method or a weighted averaging method) or other mathematical method (e.g., a linear perdition method, as detailed in "Organ motion prediction for medical treatments", written by I. Manousakas et al., and in Numerical Recipes in C, $2^{nd}$, pp. 564-272, written by W. H. Press et al.). Table 1-1 shows an example of the resulting time and location correlation table.

TABLE 1-1

| Time axis | First cycle | Second cycle | Average |
|---|---|---|---|
| +0 | 30 | 31 | 30.5 |
| +1 | 32 | 33 | 32.5 |
| +2 | 35 | 36 | 35.5 |
| +3 | 38 | 39 | 38.5 |
| +4 | 42 | 43 | 42.5 |
| +5 | 48 | 47 | 47.5 |
| +6 | 55 | 53 | 54 |
| +7 | 61 | 59 | 60 |
| +8 | 65 | 63 | 64 |
| +9 | 69 | 68 | 68.5 |
| +10 | 72 | 72 | 72 |
| +11 | 75 | 74 | 74.5 |
| +12 | 77 | 76 | 76.5 |
| +13 | 78 | 78 | 78 |
| +14 | 76 | 77 | 76.5 |
| +15 | 74 | 75 | 74.5 |
| +16 | 73 | 73 | 73 |
| +17 | 70 | 70 | 70 |
| +18 | 66 | 67 | 66.5 |
| +19 | 61 | 63 | 62 |
| +20 | 54 | 57 | 55.5 |
| +21 | 48 | 50 | 49 |
| +22 | 43 | 44 | 43.5 |
| +23 | 39 | 39 | 39 |
| +24 | 36 | 35 | 35.5 |
| +25 | 33 | 32 | 32.5 |

After that, a direction and time correlation table (see Table 1-2 below), whose data include equally spaced coordinate components corresponding to a time axis, can be further established according to the calculus coordinates acquired. More specifically, Table 1-2 is prepared according to the limits (i.e., the greatest value and the smallest value) of the coordinate component of interest. The time point to which each of the equally spaced coordinate components corresponds is calculated according to Table 1-1 (e.g., by linear interpolation, although exponential interpolation or any other suitable interpolation method is equally applicable). Then, the time axis is shifted both forward and backward by a prediction time span (e.g., ±4, as explained in more detail below), and the coordinate component (i.e., location) corresponding to each of the forwardly or backwardly shifted time point is calculated (e.g., by linear interpolation, although any other suitable interpolation method or a rounding off method is equally applicable). Herein, the term "prediction time span" refers to "the period of time between a specific time point and a future time point corresponding to which the calculus coordinates are to be predicted". For example, when the time axis has a fixed interval of 100 milliseconds and the coordinate component of interest is currently changed in a forward direction (meaning the calculus is displaced in the forward direction), the location of the calculus 200 milliseconds after the current time point is referred to as the +2 location. Conversely, if the coordinate component of interest is currently changed in a backward direction (meaning the calculus is displaced in the backward direction), the location of the calculus 300 milliseconds after the current time point is referred to as the −3 location. The following table shows locations corresponding to a prediction time span of 400 milliseconds, namely the +4 locations and the −4 locations, and is used as follows. Assuming the coordinate component of interest is currently location 37 and it is desired to predict what the coordinate component will be after 400 milliseconds, the first step of using the table is to find the time point 2.5 at the intersection of the "Location" row 37 and the "Time axis (forward displacement)" column. Following that, add +4 (400 milliseconds) to 2.5 to produce 6.5, look down the "Time axis (forward displacement)" column for the time point closest to 6.5, and find the corresponding "location 57". That is to say, the +4 location of location 37 is location 57.

TABLE 1-2

| Location | Time axis (forward displacement) | Time axis (backward displacement) | +4 location | −4 location |
|---|---|---|---|---|
| 30 | 0 | 25 | 43 | 43 |
| 31 | 0.25 | 25 | 44 | 43 |
| 32 | 0.75 | 25 | 46 | 43 |
| 33 | 1.17 | 24.89 | 48 | 42 |
| 34 | 1.5 | 24.5 | 51 | 40 |
| 35 | 1.83 | 24.17 | 53 | 39 |
| 36 | 2.17 | 23.86 | 55 | 38 |
| 37 | 2.5 | 23.57 | 57 | 37 |
| 38 | 2.83 | 23.29 | 59 | 36 |
| 39 | 3.13 | 23 | 61 | 35 |
| 40 | 3.38 | 22.82 | 61 | 35 |
| 41 | 3.63 | 22.64 | 62 | 34 |
| 42 | 3.87 | 22.45 | 63 | 34 |
| 43 | 4.1 | 22.27 | 64 | 33 |
| 44 | 4.3 | 21.91 | 65 | 32 |
| 45 | 4.5 | 21.73 | 66 | 32 |
| 46 | 4.7 | 21.55 | 67 | 32 |
| 47 | 4.9 | 21.36 | 68 | 31 |
| 48 | 5.08 | 21.18 | 69 | 31 |
| 49 | 5.23 | 21 | 69 | 32 |
| 50 | 5.38 | 20.85 | 70 | 33 |
| 51 | 5.53 | 20.69 | 70 | 34 |
| 52 | 5.69 | 20.54 | 71 | 34 |
| 53 | 5.85 | 20.38 | 71 | 35 |
| 54 | 6 | 20.23 | 72 | 35 |
| 55 | 6.17 | 20.08 | 72 | 35 |
| 56 | 6.33 | 19.92 | 73 | 36 |
| 57 | 6.5 | 19.77 | 73 | 36 |
| 58 | 6.67 | 19.62 | 74 | 37 |
| 59 | 6.83 | 19.46 | 74 | 37 |
| 60 | 7 | 19.31 | 74 | 38 |
| 61 | 7.25 | 19.15 | 75 | 38 |
| 62 | 7.5 | 19 | 75 | 39 |
| 63 | 7.75 | 18.78 | 76 | 40 |
| 64 | 8 | 18.56 | 76 | 41 |
| 65 | 8.22 | 18.33 | 77 | 43 |
| 66 | 8.44 | 18.11 | 77 | 43 |
| 67 | 8.67 | 17.86 | 77 | 44 |
| 68 | 8.89 | 17.57 | 78 | 46 |
| 69 | 9.14 | 17.29 | 78 | 47 |
| 70 | 9.43 | 17 | 77 | 49 |
| 71 | 9.71 | 16.67 | 77 | 51 |
| 72 | 10 | 16.33 | 76 | 53 |
| 73 | 10.4 | 16 | 75 | 56 |
| 74 | 10.8 | 15.3 | 75 | 60 |
| 75 | 11.25 | 14.5 | 74 | 64 |
| 76 | 11.75 | 14.25 | 73 | 65 |

TABLE 1-2-continued

| Location | Time axis (forward displacement) | Time axis (backward displacement) | +4 location | −4 location |
|---|---|---|---|---|
| 77 | 12.33 | 13.67 | 72 | 67 |
| 78 | 13 | 13 | 70 | 70 |

Referring back to FIG. 1 and FIG. 2, the motion function is formed by substituting data in the time and location correlation table into a predetermined original equation. For example and without limitation, the motion function can be a simple harmonic motion function or a linear function.

More specifically, the simple harmonic motion function can be expressed by:

$$f(x) = (h-l)\left[0.5\sin\left(\frac{2\pi x}{t} - 0.5\pi\right) + 0.5\right] + l,$$

$$x = \begin{cases} x, & x < t \\ x \bmod t, & x \geq t \end{cases},$$

where h is the greatest value of a coordinate component of a set of calculus coordinates acquired from a sampled respiration cycle, l is the smallest value of the coordinate component of the set of calculus coordinates acquired from the sampled respiration cycle, t is the duration of the sampled respiration cycle, and x is a specific time point. The following examples, with values shown respectively in Table 2-1 and Table 2-2, illustrate how to predict the calculus coordinates at different time points using the simple harmonic motion function defined above.

Table 2-1 shows the case of patient 1, with h=15, l=−15, and t=3.

TABLE 2-1

| f (0) | −15 |
|---|---|
| f (1.5) | 15 |
| f (7) = f (1) | 7.5 |
| f (4.3) = f (1.3) | 13.7032 |
| f (5.55) = f (2.55) | −8.8167 |

Table 2-2 shows the case of patient 2, with h=100, l=0, and t=4.5.

TABLE 2-2

| f (0) | 0 |
|---|---|
| f (2.25) | 100 |
| f (7.5) = f (3) | 75 |
| f (10.1) = f (1.1) | 48.2550 |
| f (12.34) = f (3.34) | 52.4425 |

The linear function, on the other hand, can be expressed by:

$$f(x) = \frac{2x(h-l)}{t} + l,$$

$$x = \begin{cases} x, & \leq 0.5 \\ t-x, & 0.5t < x < t \\ x \bmod t, & x \geq t \end{cases}$$

where h is the greatest value of a coordinate component of a set of calculus coordinates acquired from a sampled respiration cycle, l is the smallest value of the coordinate component of the set of calculus coordinates acquired from the sampled respiration cycle, t is the duration of the sampled respiration cycle, and x is a specific time point. The following examples, with values shown respectively in Table 3-1 and Table 3-2, illustrate how to predict the calculus coordinates at different time points using the linear function defined above.

Table 3-1 shows the case of patient 1, with h=15, l=−15, and t=3.

TABLE 3-1

| f (0) | −15 |
|---|---|
| f (1.5) | 15 |
| f (7) = f (1) | 5 |
| f (4.3) = f (1.3) | 11 |
| f (5.55) = f (2.55) | −6 |

Table 3-2 shows the case of patient 2, with h=100, l=0, and t=4.5.

TABLE 3-2

| f (0) | 0 |
|---|---|
| f (2.25) | 100 |
| f (7.5) = f (3) | 66.6667 |
| f (10.1) = f (1.1) | 48.8889 |
| f (12.34) = f (3.34) | 51.5556 |

In the prediction step S03, the calculus coordinate acquisition module 2 obtains a displacement direction by analyzing the calculus coordinates acquired respectively from different sampled respiration cycles and acquires the current calculus coordinates of the calculus, in order for the first prediction module 5a to derive a first set of predicted calculus coordinates from the current calculus coordinates and the motion function, and for the second prediction module 5b to obtain a second set of predicted calculus coordinates by looking up the direction and time correlation table (which has a predetermined time interval) according to the displacement direction and the current calculus coordinates. The first set of predicted calculus coordinates and the second set of predicted calculus coordinates correspond to two different weights respectively. The weights can be adjusted by a weight adjustment module 51 according to whether or not the first set of predicted calculus coordinates and the second set of predicted calculus coordinates are accurate.

For instance, the weight of the first set of predicted calculus coordinates is preset as 1, and that of the second set of predicted calculus coordinates is preset as 0. If the first set of predicted calculus coordinates are accurate but the second set of predicted calculus coordinates are not, the weight adjustment module 51 keeps the weight of the first set of predicted calculus coordinates at 1 and the weight of the second set of predicted calculus coordinates at 0. If the second set of predicted calculus coordinates are accurate but the first set of predicted calculus coordinates are not, the weight adjustment module 51 resets the weight of the first set of predicted calculus coordinates to 0 and the weight of the second set of predicted calculus coordinates to 1. If both sets of predicted calculus coordinates are accurate, the initial weights remain.

In the firing determination step S04, with continued reference to FIG. 1 and FIG. 2, the firing determination module 6 determines it is time to drive the shock wave module 7 when the first set of predicted calculus coordinates or the second set of predicted calculus coordinates, whichever have the greater weight, are within a predetermined target area. The shock wave module 7, once driven, generates a shock wave toward the target area. The target area can be but is not limited to a circular area with a diameter ranging from 11 to 13 mm. The size and shape of the target area may vary according to practical needs or with the shock wave module 7. It is worth mentioning that the location of the target area in this embodiment is generally fixed, but the present invention imposes no limitation in this regard. The target area may be shifted in position by a displacement module in response to displacement of the calculus coordinates.

Figure 5:
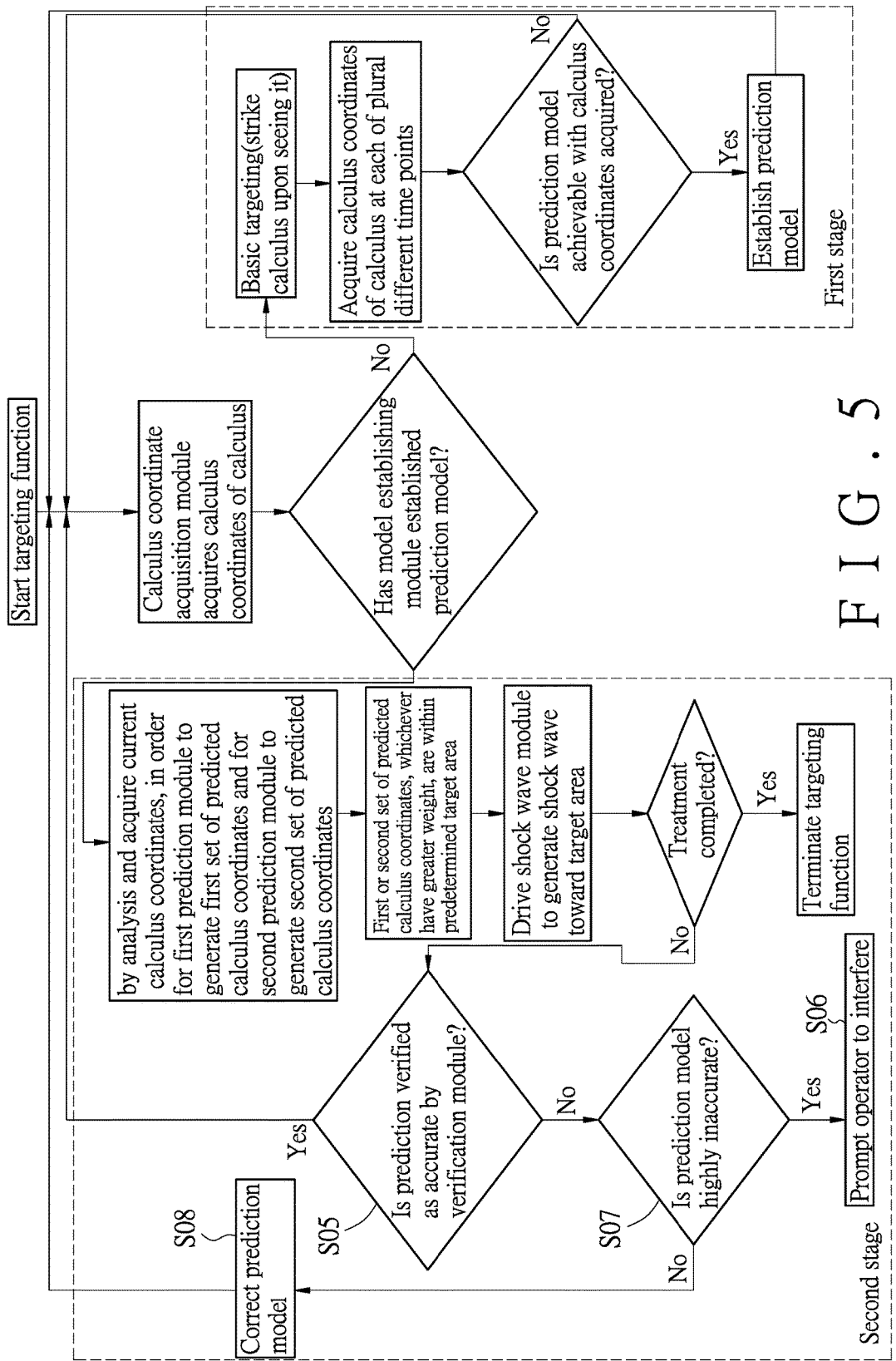
FIG. 5 is a flowchart showing further steps of the embodiment of FIG. 2, namely the verification step, the prompting step, the error analysis step, and the error correction step.
Figure 6:
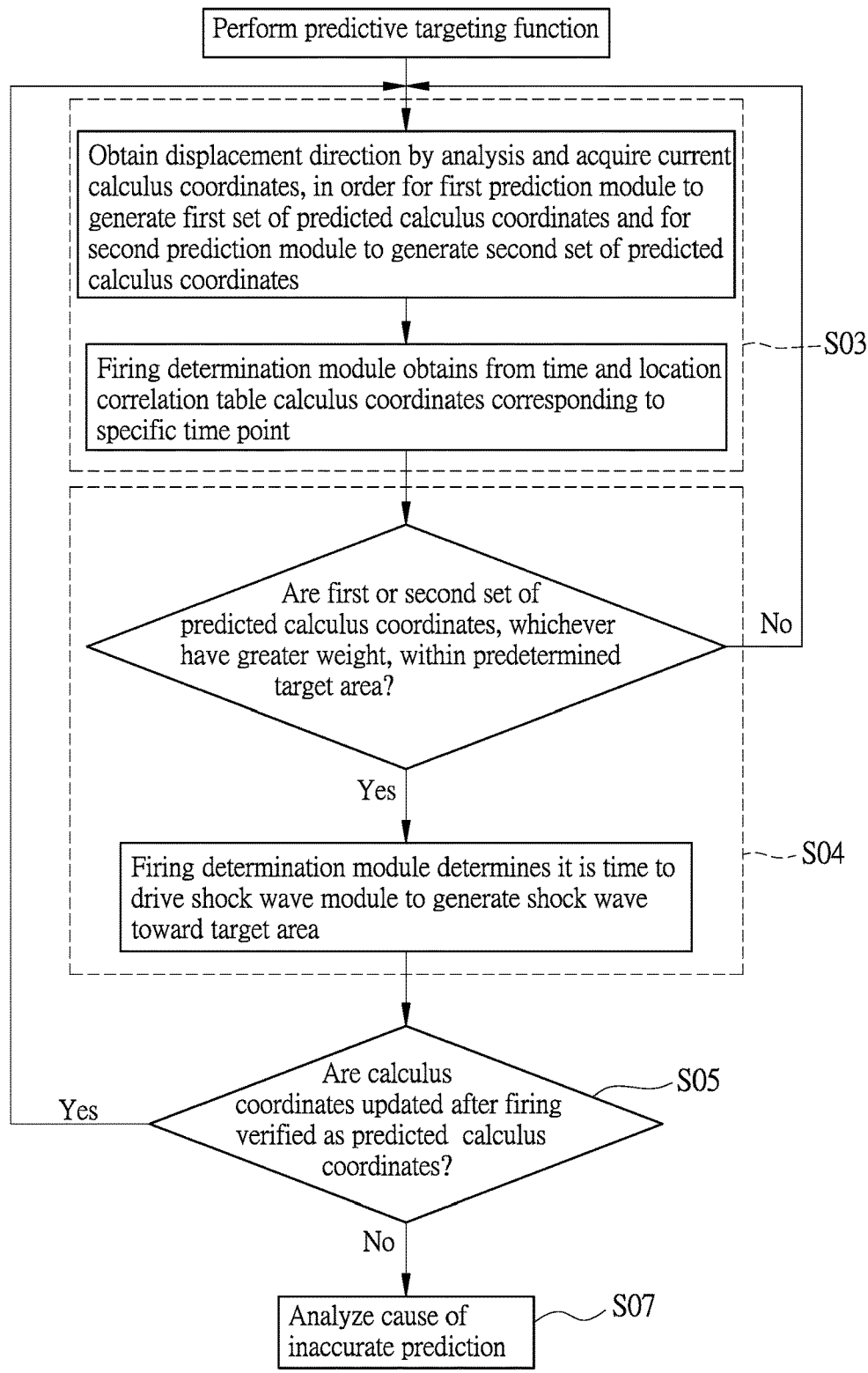
FIG. 6 is a detailed flowchart of the prediction step, the firing determination step, and the verification step of the embodiment of FIG. 2.

Preferably, referring to FIG. 1 and FIG. 5, the calculus targeting system 100 further includes a verification module 8, a prompting module 9, an analysis module 10, and a correction module 11, all connected to the processor 1. The verification module 8 is configured to perform a verification step S05 for verifying that the error of the prediction model is within a predetermined reasonable range and is therefore normal. If the error exceeds the predetermined reasonable range, the analysis module 10 will perform an error analysis step S07 so that either the prompting module 9 (e.g., a prompting light, a display screen, or a loudspeaker) performs a prompting step S06 by generating a prompt signal (e.g., light or sound) or the correction module 11 performs an error correction step S08. A real-time feedback, or even real-time correction, on the abnormal condition is thus made to increase the safety of use of the system. As shown in FIG. 6, the main process flow sequentially includes the prediction step S03, the firing determination step S04, the verification step S05, and the error analysis step S07.

Figure 7:
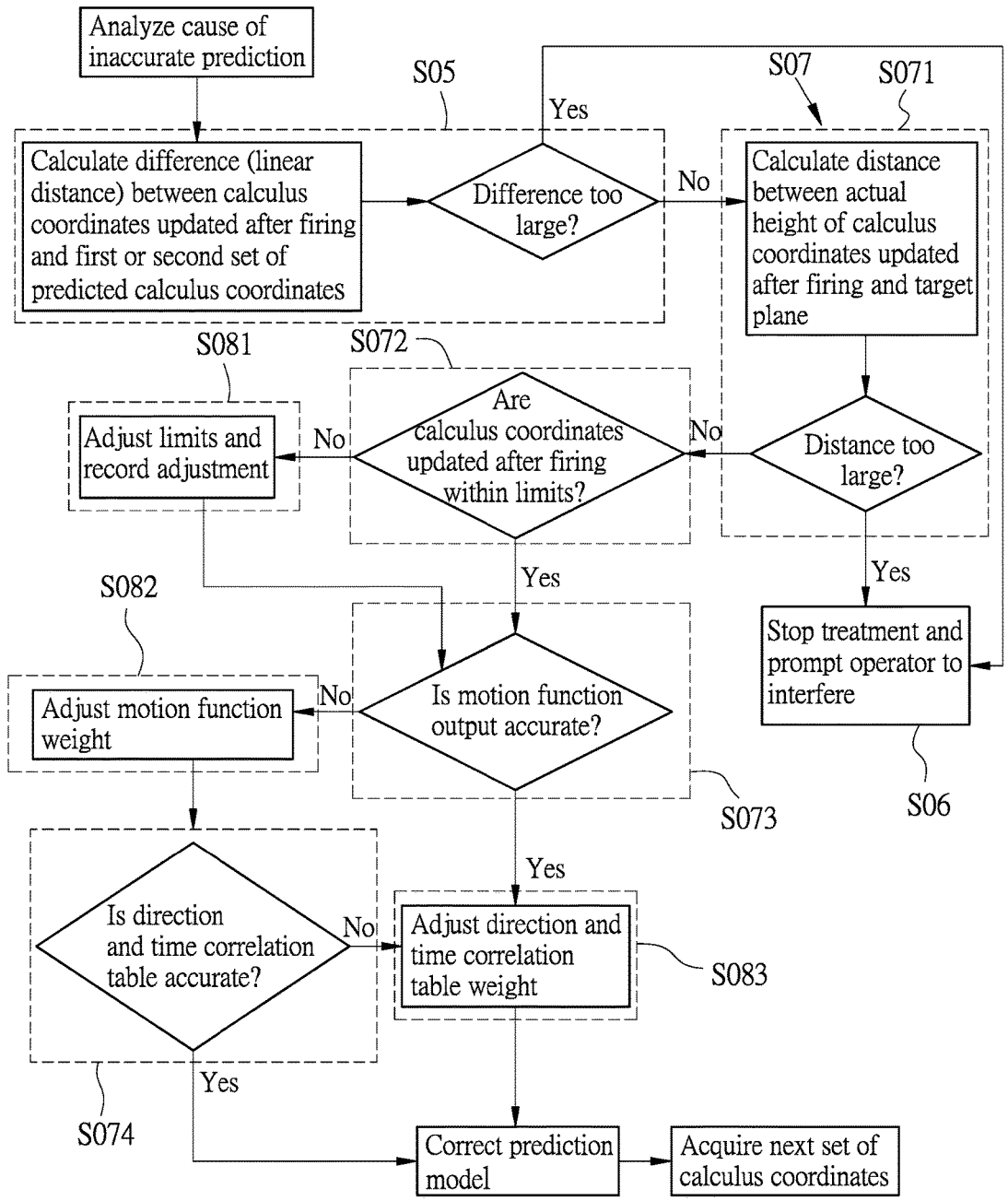
FIG. 7 is a detailed flowchart of the verification step, the error analysis step, and the error correction step of the embodiment of FIG. 2.

Referring to FIG. 7 in conjunction with FIG. 1, the verification step S05 begins with the verification module 8 comparing the first set of predicted calculus coordinates or the second set of predicted calculus coordinates with the calculus coordinates updated after firing. If the difference between the first or second set of predicted calculus coordinates and the calculus coordinates updated after firing is greater than a predetermined threshold value, the error analysis step S07 is carried out. The error analysis step S07 includes a height comparison sub-step S071 and a limit comparison sub-step S072. The height comparison sub-step S071 compares the vertical height of the first or second set of predicted calculus coordinates with the vertical height of the calculus coordinates updated after firing to generate a vertical height difference. If the vertical height difference exceeds a predetermined height difference threshold value, execution of the calculus targeting method will be terminated, and the prompting step S06, performed. The limit comparison sub-step S072 determines whether or not each coordinate component of the calculus coordinates updated after firing is between the corresponding greatest value (i.e., upper limit) and the corresponding smallest value (i.e., lower limit) in the time and location correlation table and/or the direction and time correlation table.

Referring again to FIG. 7 in conjunction with FIG. 1, the error correction step S08 includes a limit correction sub-step S081. When a coordinate component of the calculus coordinates updated after firing is not between the corresponding greatest value and the corresponding smallest value in the time and location correlation table and/or the direction and time correlation table, the correction module 11 adjusts the corresponding greatest value and the corresponding smallest value in the time and location correlation table and/or the direction and time correlation table according to the calculus coordinates updated after firing and thereby updates the time and location correlation table and/or the direction and time correlation table.

Referring again to FIG. 7 in conjunction with FIG. 1, the error correction step S08 preferably further includes a function weight correction sub-step S082 and a correlation table weight correction sub-step S083, and the error analysis step S07 preferably further includes a motion function analysis sub-step S073 and a direction and time correlation table analysis sub-step S074. After a greatest value and the corresponding smallest value in the time and location correlation table and/or the direction and time correlation table are adjusted in the limit correction sub-step S081, the first set of predicted calculus coordinates and the second set of predicted calculus coordinates are recalculated in the motion function analysis sub-step S073. The motion function analysis sub-step S073 then determines the accuracy of the motion function according to the closeness between the recalculated calculus coordinates and the calculus coordinates updated after firing. If the motion function is accurate, there is no need to adjust its weight; otherwise, the weight adjustment module 51 performs the function weight correction sub-step S082 by reducing the weight of the motion function. The direction and time correlation table analysis sub-step S074 is then conducted to determine whether the coordinate components in the direction and time correlation table correspond to the calculus coordinates updated after firing. If no, the weight adjustment module 51 performs the correlation table weight correction sub-step S083 by reducing the weight of the direction and time correlation table. Thus, the foregoing sub-steps help correct the prediction model.

The above description of the embodiments should be able to enable a full understanding of the operation, use, and effects of the present invention. It should be understood, however, that the embodiments disclosed herein are only some preferred ones of the invention and are not intended to be restrictive of the scope of the invention. All simple equivalent changes and modifications made according to this specification and the appended claims should fall within the scope of the present invention.

What is claimed is:

1. A calculus targeting and breaking method, comprising:
    executing a calculus coordinate acquisition module to acquire a set of calculus coordinates of a calculus at each of a plurality of different time points in at least one sampled respiration cycle;
    executing a model establishing module to establish a time and location correlation table of a fixed sampling interval according to the calculus coordinates acquired and establishes a prediction model according to the time and location correlation table, wherein the prediction model includes a motion function and a direction and time correlation table, the motion function is formed by substituting data in the time and location correlation table into a predetermined original equation, and the direction and time correlation table includes data that are derived from the time and location correlation table and include equally spaced coordinate components corresponding to a time axis;
    executing the calculus coordinate acquisition module to obtain a displacement direction by analyzing the calculus coordinates acquired from a first of said sampled respiration cycles and the calculus coordinates acquired from a second of said sampled respiration cycles and acquires current calculus coordinates of the calculus, in order for a first prediction module to derive a first set of predicted calculus coordinates from the current calculus coordinates and the motion function, and for a second prediction module to obtain a second set of predicted calculus coordinates by looking up the direction and time correlation table, which has a predetermined time interval, according to the displacement direction and the current calculus coordinates, wherein the first set of predicted calculus coordinates correspond to a weight, the second set of predicted calculus coordinates correspond to a weight different from the weight of the first set of predicted calculus coordinates, and the weights are adjustable by a weight adjustment module according to whether or not the first set of predicted calculus coordinates and the second set of predicted calculus coordinates are accurate;

executing a firing determination module to determine when the first set of predicted calculus coordinates or the second set of predicted calculus coordinates, whichever have the greater weight, are within a predetermined target area; and responsive to the determination of the firing determination module, executing a shock wave module to generate a shock wave toward the target area, the calculus thereby subjected to pressure by the shock wave to break the calculus.

2. The calculus targeting and breaking method of claim 1, wherein there are a plurality of said sampled respiration cycles, and wherein coordinate components corresponding to identical or adjacent said time points in the sampled respiration cycles are rendered into a single coordinate component by a statistical method.

3. The calculus targeting and breaking method of claim 1, wherein the original equation is a simple harmonic motion function or a linear function.

4. The calculus targeting and breaking method of claim 1, wherein the original equation is a simple harmonic motion function expressed by:

$$f(x) = (h-l)\left[0.5\sin\left(\frac{2\pi x}{t} - 0.5\pi\right) + 0.5\right] + l,$$

$$x = \begin{cases} x, x < t \\ x \bmod t, x \geq t \end{cases},$$

where h is a greatest value of a coordinate component of a set of said calculus coordinates acquired from one of said sampled respiration cycles, l is a smallest value of the coordinate component of the set of calculus coordinates acquired from the sampled respiration cycle, t is a duration of the sampled respiration cycle, and x is a specific said time point.

5. The calculus targeting and breaking method of claim 4, further comprising:

executing a verification module to compare the first set of predicted calculus coordinates or the second set of predicted calculus coordinates with calculus coordinates updated after firing and determines whether or not a difference between the first set of predicted calculus coordinates or the second set of predicted calculus coordinates and the calculus coordinates updated after firing is greater than a predetermined threshold value;

generating a prompt signal;

analyzing a cause of an error of the first set of predicted calculus coordinates or the second set of predicted calculus coordinates; and executing a correction module to correct the prediction model, thereby increasing accuracy of the predicted calculus coordinates;

wherein one or a combination of the prompt signal generation, the error cause analysis, and the prediction model correction are performed when the difference between the first set of predicted calculus coordinates or the second set of predicted calculus coordinates and the calculus coordinates updated after firing is greater than the predetermined threshold value.

6. The calculus targeting and breaking method of claim 5, wherein the error cause analysis includes:

comparing a vertical height of the first set of predicted calculus coordinates or a vertical height of the second set of predicted calculus coordinates with a vertical height of the calculus coordinates updated after firing to generate a vertical height difference;

if the vertical height difference is greater than a height difference threshold value, terminating of the calculus targeting method;

determining whether or not each coordinate component of the calculus coordinates updated after firing is between a corresponding greatest value and a corresponding smallest value in the time and location correlation table and/or the direction and time correlation table; and if one of said coordinate components of the calculus coordinates updated after firing is not between the corresponding greatest value and the corresponding smallest value in the time and location correlation table and/or the direction and time correlation table, adjusting the corresponding greatest value and the corresponding smallest value according to the calculus coordinates updated after firing.

7. The calculus targeting and breaking method of claim 1, wherein the original equation is a linear function expressed by:

$$f(x) = \frac{2x(h-l)}{t} + l,$$

$$x = \begin{cases} x, \leq 0.5 \\ t-x, 0.5t < x < t, \\ x \bmod t, x \geq t \end{cases}$$

where h is a greatest value of a coordinate component of a set of said calculus coordinates acquired from one of said sampled respiration cycles, l is a smallest value of the coordinate component of the set of calculus coordinates acquired from the sampled respiration cycle, t is a duration of the sampled respiration cycle, and x is a specific said time point.

8. The calculus targeting and breaking method of claim 7, further comprising:

executing a verification module to compare the first set of predicted calculus coordinates or the second set of predicted calculus coordinates with calculus coordinates updated after firing and determines whether or not a difference between the first set of predicted calculus coordinates or the second set of predicted calculus coordinates and the calculus coordinates updated after firing is greater than a predetermined threshold value;

generating a prompt signal;

analyzing a cause of an error of the first set of predicted calculus coordinates or the second set of predicted calculus coordinates; and executing a correction module to correct the prediction model, thereby increasing accuracy of the predicted calculus coordinates;

wherein one or a combination of the prompt signal generation, the error cause analysis, and the prediction model correction are performed when the difference between the first set of predicted calculus coordinates or the second set of predicted calculus coordinates and the calculus coordinates updated after firing is greater than the predetermined threshold value.

9. A calculus targeting and breaking method, comprising:

executing a calculus coordinate acquisition module to acquire a set of calculus coordinates of a calculus at each of a plurality of different time points in at least one sampled respiration cycle;

executing a model establishing module to establish a time and location correlation table of a fixed sampling interval according to the calculus coordinates acquired and establishes a prediction model according to the time and location correlation table, wherein the prediction model includes a motion function formed by substituting data in the time and location correlation table into a predetermined original equation;

executing the calculus coordinate acquisition module to acquire current calculus coordinates of the calculus, in order for a first prediction module to derive a first set of predicted calculus coordinates from the current calculus coordinates and the motion function;

executing a firing determination module to determine when the first set of predicted calculus coordinates are within a predetermined target area; and responsive to the determination of the firing determination module, executing a shock wave module to generate a shock wave toward the target area, the calculus thereby subjected to pressure by the shock wave to break the calculus.

10. A shock wave lithotriptor for targeting and breaking a calculus of a subject under examination, comprising:

a processor;

a storage unit connected to the processor and configured to store a predetermined motion function;

a calculus coordinate acquisition module connected to the processor and configured to acquire a set of calculus coordinates of the calculus at each of a plurality of different time points in a sampled respiration cycle;

a model establishing module connected to the processor and configured to establish a time and location correlation table according to the calculus coordinates acquired and establish a prediction model according to the time and location correlation table, wherein the prediction model includes the motion function and a direction and time correlation table, the motion function is formed by substituting data in the time and location correlation table into a predetermined original equation, and the direction and time correlation table includes data that are derived from the time and location correlation table and include equally spaced coordinate components corresponding to a time axis;

a prediction module connected to the processor, the prediction module including:

a preparation module configured to obtain a displacement direction by analyzing the calculus coordinates acquired, through the calculus coordinate acquisition module, and to acquire current calculus coordinates of the calculus, also through the calculus coordinate acquisition module, a first prediction module configured to derive a first set of predicted calculus coordinates from the current calculus coordinates and the motion function, wherein the first set of predicted calculus coordinates correspond to a weight;

a second prediction module configured to obtain a second set of predicted calculus coordinates by looking up the direction and time correlation table, which has a predetermined time interval, according to the displacement direction and the current calculus coordinates, wherein the second set of predicted calculus coordinates correspond to a weight different from the weight of the first set of predicted calculus coordinates;

a weight adjustment module connected to the processor and configured to adjust the weights according to whether or not the first set of predicted calculus coordinates and the second set of predicted calculus coordinates are accurate;

a firing determination module connected to the processor and configured to determine when the first set of predicted calculus coordinates or the second set of predicted calculus coordinates, whichever have the greater weight, are within a predetermined target area; and a shock wave module connected to the firing determination module and configured to generate a shock wave toward the target area responsive to the determination of the firing determination module, the calculus thereby subjected to pressure by the shock wave to break the calculus.

* * * * *